United States Patent Office 3,446,615
Patented May 27, 1969

3,446,615
HAFNIUM BASE ALLOYS
Vernon L. Hill, Niles, John J. Rausch, Evanston, Alan L. Hess, Lemont, Ray J. Van Thyne, Oaklawn, and Harry R. Nichols, Chicago, Ill., assignors to IIT Research Institute, Chicago, Ill., a not-for-profit corporation of Illinois
No Drawing. Filed May 11, 1967, Ser. No. 643,004
Int. Cl. C22c 31/00
U.S. Cl. 75—134                                      2 Claims

ABSTRACT OF THE DISCLOSURE

A method and related compositions for applying metallic coatings onto a variety of substrates by depositing a slurry of the coating materials and heating through various stages to form the coating. The slurry consists of an organic carrier vehicle or binder, particulate fugitive metal powders and powders of the coating constituents. Upon heating, the organic carrier vehicle is first driven off; subsequent heating causes both the practically complete vaporization of the fugitive metal and the bonding of a coherent metal coating onto the substrate material. The process is especially suited for the application of certain refractory metal coatings onto a variety of refractory substrates.

---

The invention described herein was made in the performance of work under a National Aeronautics and Space Administration contract and is subject to the provisions of Section 305 of the National Aeronautics and Space Act of 1958, Public Law 85–568 (72 Stat. 435; 42 U.S.C. 2457).

BACKGROUND OF THE INVENTION

It is quite apparent that modern technology, especially in the aerospace field, is constantly and consistently striving for operations under conditions of exceptionally high temperature. This in turn has made material requirements more and more stringent and one finds increasing use of metals which until recently fell or still fall within the so-called "exotic" realm, in terms of cost, availability, etc. In the fabrication of, for example, rocket nozzles, the high temperature conditions are most severe. It is mandatory that such a structure maintain its integrity and a reasonable strength, yet at the same time be fabricable into the sometimes relatively complex shapes that are required. As a result, not only has there developed the use of integral metallic structures of rather sophisticated refractory alloys and the like, but there has also developed certain coatings and cladding processes to provide high temperature protection for relatively less exotic and more machinable substrate materials.

In some instances, ceramic coatings have been and are still bieng used for rocket nozzle protection and various techniques have been developed to apply such coatings.

The ceramic coatings, while providing excellent temperature stability and protection, have proven to be, as one might well expect, somewhat brittle and accordingly one is led to the use of metal coatings of a highly refractory nature to protect a variety of underlying substrates in a high temperature environment. Here we are considering primarily coatings of tantalum, columbium, iridium, titanium, rhenium and various refractory alloys thereof, and it is to the method of depositing these refractory metals and their refractory alloys that the present invention is primarily directed. Because of the nature of these materials, especially their property of oxidizing in air at high temperatures, it has been practically impossible to prepare sound, nonporous coatings from their powders and as a result, the art has been limited to the cladding of foils or sheets of these materials onto the underlying substrate. As is set out below in greater detail, in our present invention coatings are produced from particulate materials of these refractory metals and alloys. Accordingly, metal cladding with the inherent difficulties of application to the substrate, especially the complex shaped substrate, has been overcome. We have been able to produce dense refractory metal coatings from powders of these materials which coatings provide excellent high temperature protection for the underlying substrates, or in some cases present an intermediate layer for subsequent treatment.

SUMMARY OF THE INVENTION

Our invention is directed to the process for applying a refractory metal coating from a slurry. In the practice of our process, a slurry is first formed which consists essentially of three components, namely, particulate metallic coating constituents, a particulate fugitive metallic constituent and a carrier liquid. The slurry is applied to the substrate sought to be coated by brushing, dipping, spraying or by other similar means, and is then gradually heated. The materials used are so selected that upon heating, the carrier liquid first volatizes and is driven off. The means used for driving off the organic carrier vehicle need not be an integral part of the heating cycle provided that a reasonable rate of evaporation is accomplished. The organic vehicle which is preferably used, although it can be inorganic residue acts as a binder providing "green strength" to the deposited slurry prior to sintering of the particulate coating constituents. Subsequent heating at increasing temperatures first melts the fugitive metallic constituent, then causes the sintering of the metallic coating constituent or constituents, after which further heating at higher temperatures then vaporizes substantially all of the fugitive metal leaving an integral coating of the metallic coating constituent or constituents on the substrate. The process is easily and conveniently carried out with a number of refractory metallic coating constituents to provide a metallic coating of readily controlled thickness and density.

Accordingly, a primary object of our invention is to provide a new method of applying refractory metal coatings.

A more specific object of our invention is to provide a method of applying refractory metal coatings employing a slurry consisting of particulate metal coating constituent (i.e., the material that actually is the coating), particulate fugitive metal constituent and a liquid carrier vehicle.

These and other objects, features and advantages of our invention will become apparent to those skilled in this particular art from the following detailed disclosure thereof.

DESCRIPTION OF THE PREFERRED EMBODIMENTS

One embodiment of our invention relates to the method of coating tungsten or molybdenum substrates with tantalum or columbium. These metals as coatings find utility as diffusion and reaction barriers on tungsten or molybdenum substrates. Generally speaking, the coatings are applied from a slurry formed by blending powders of tantalum or columbium with copper or silver or copper-silver mixtures and suspending such metal powders in a suitable fluid liquid carrier. Similarly, the process is useful in coating tungsten base or molybdenum base alloys with tantalum base or columbium base alloys.

The slurry mixture is applied to the substrate by painting, dipping or spraying. Following this application, the coated materials are then heated in a vacuum, or inert, or reducing atmosphere to first remove the carrier vehicle binder and then are subsequently further heated until a metallic liquid phase is developed. This liquid, resulting primarily from the melting of the fugitive metallic vehicle partially dissolves the tantalum or columbium powder and at the same time wets and flows uniformly over the tungsten or molybdenum substrate. An important characteristic of our process is that this liquid metal dissolves only a very negligible quantity of the substrate. When uniform or substantially uniform flow of the fugitive metal has been attained, the combination of additional heating at higher temperatures and/or exposure to reduced pressure is employed to slowly remove the fugitive metal by evaporation. The resultant coating is of uniform thickness, is metallurgically bonded to the substrate and is free of cracks and macroporosity.

In all of the embodiments of our invention, it is essential that the liquid carrier vehicle obviously not react with either of the metallic constituents of the coating or with the substrate. For this material we have used, for example, nitrocellulose lacquers, collodion-acetone mixtures and similar organic materials. Various inorganic binders may also be employed.

In this aspect of our invention the metal constituents of the slurry are from 25 to 50 weight percent silver or copper or a mixture of silver and copper, balance columbium or tantalum powder. Powder particle size we find is relatively unimportant provided that all of the powders are finer than minus 200 mesh.

This embodiment of our invention may be further understood by reference to the following example:

Example 1

A tungsten sheet coupon was dipped into a slurry consisting of 25 grams of copper powder blended with 75 grams of columbium powder suspended in 20 grams of nitrocellulose lacquer containing 20% by volume collodion. After dipping the slurry was permitted to air dry. Thicker coatings may be obtained by repeated dippings with air drying between dippings.

The coated tungsten, having the coating now in the so-called "green" state, is heated slowly in a vacuum or inert atmosphere to approximately 1000° F. to remove the binder. In raising the temperature from room temperature to the approximate 1000° F. value, one should proceed rather slowly. As the binder is volatilized, gases will be given off and by raising the temperature slowly one prevents these evolved gases from driving off the metallic constituents.

After the binder has been removed, heating is continued until the fugitive metal constituent is molten and is held at 2200° F. until complete wetting of the tungsten substrate by the fugitive vehicle has occurred. Then one heats further to approximately 2300° F. to vaporize and drive off the fugitive metal vehicle while at the same time liquid phase sintering the columbium powders to form an adherent coating on the substrate.

Another embodiment of our invention is directed to the aforesaid coating process for applying a tantalum-hafnium alloy coating onto a tantalum-tungsten substrate. Here similarly a three component slurry is used, said slurry consisting of the carrier vehicle or binder liquid, a fugitive metal constituent and the refractory metal coating constituents. Again the metals are particulate, of the same size range as is set out above and the carrier liquids used are the same as are set forth above. Such coatings of hafnium-tantalum alloys in the range of from 15 to 30 weight percent tantalum, balance hafnium are useful in protecting tantalum and tantalum base alloys in oxidizing environments at temperatures up to 4000° F. Previous work has shown that coatings of this type have been applied by hot roll cladding the Hf-Ta coating to the tantalum alloy substrate; however the roll cladding process is limited to simple shapes such as sheet material. In addition, the roll cladding process does not result in edge protection. Therefore, in order to fully utilize the potential of the hafnium-tantalum alloy coating system as a protective material, the present slurry coating process which is amendable to complex shapes and to the coating of edges, shows considerable promise and utility.

It should be noted that the slurry process using the hafnium-tantalum as the coating is useful for the protection of a variety of refractory metal and refractory ceramic substrates. The slurry may be formed by mixing powders of either elemental hafnium and tantalum or powders of a premade master hafnium-tantalum alloy. As before the fugitive metal vehicle accelerates the sintering of the hafnium-tantalum alloy to the refractory substrate during heat treatment and the organic vehicle acts as a binder for the slurry until sintering occurs and then is removed by evaporation during heat treatment.

This embodiment of our invention may be further understood by reference to the following example:

Example 2

Into 20 grams of a carrier liquid was mixed 100 grams of metal powders consisting of both the metal coating constitutents and the fugitive metal to form a slurry thereof. Such metal powders were weighed out as follows:

|  | Grams |
|---|---|
| Tantalum | 19.2 |
| Hafnium | 76.8 |
| Copper | 3.0 |
| Aluminum | 1.0 |

The carrier vehicle consisted of 20% by volume collodion in nitrocellulose lacquer.

A coupon of an alloy consisting of 90% tantalum–10% tungsten (said coupon being 1" x ½" x 0.060") was dipped into the slurry to leave a thing coating thereon. If one wishes a thicker coating, repeated dipping is used, but we prefer that between each dip the coating be permitted to air dry.

The coated coupon is next placed in a furnace provided with a vacuum or inert gas atmosphere. We prefer to use argon for this purpose but in this example used a vacuum. The coated piece is heated rather slowly from room temperature to 200° F. over a 5 minute period in the vacuum to prevent evolved gases from driving off or fracturing the coating. The work piece is maintained at this temperature until the vacuum pressure in the furnace returns to the start-up pressure, around $10^{-5}$ mm. Hg. We note that during the outgassing of the liquid carrier that pressure in the furnace should be maintained at (no greater than on the order of) $10^{-3}$ mm. Hg. After this pressure condition has been reestablished the furnace temperature is raised to 1500° F. over the next 30 minutes with due care being taken to maintain the pressure in the furnace around $10^{-3}$ mm. Hg. We also note that the heating rate is somewhat dependent upon coating thickness—with thicker coatings a slower heating rate should be used than with thinner ones.

Obviously when attaining a temperature of 1500° F. the liquid carrier vehicle has been volatilized and is removed.

It is also noted that aluminum melts at approximately 1220° F. whereas copper melts at 1980° F. and as the aluminum begins to melt first it dissolves some of the copper. For this reason we prefer to use this fugitive metal in the prealloyed state; this permits a more uniform application of the slurry coating in that we now have a fugitive vehicle with a single melting point.

Subsequently the temperature of the furnace is increased to 2190° F., or a range between 2190° and 2370° F. At this point the copper-aluminum dissolves part of the hafnium-tantalum and concurrently the green powder structure of the slurry collapses. The temperature is held at 2190° F. for from two to four hours to accomplish liquid phase sintering. By this elemental hafnium and tantalum dissolve and at the same time an alloy of hafnium—approximately 20% tantalum precipitates out. Similarly at this temperature point the coating becomes more and more dense. Then the temperature is raised to 2700° F. in a vacuum to remove most of the remaining copper-aluminum. As a practical matter, the copper-aluminum level is down to less than one quarter of one percent. Following this, the piece is held at 2700° F. for 12 hours—the holding time being dependent upon the thickness of the coating and being proportional thereto—to complete the process of having a dense hafnium-tantalum coating on the tantalum base alloy substrate.

Our process may be used generally in depositing hafnium-tantalum alloys of the composition 15 to 30 weight percent tantalum, balance hafnium onto a plurality of refractory metals or refractory ceramic substrates. While the most effective fugitive metal system appears to be a mixture of copper and aluminum with a copper to aluminum ratio of either 3 to 1 or 2 to 1, metals of the group selected from copper, silver, tin and aluminum or alloys thereof may be similarly used as such fugitive metal. Relatively small amounts by weight of these materials should be employed in order to avoid degradation of the oxidation resistance of the hafnium-tantalum alloy coating.

The amount of fugitive metal vehicle necessary for a good coating is related to the desired thickness as well as the temperature and pressure during sintering. As a coating gets thicker a lower percentage of the fugitive metal is necessary because the evaporation rate is lower in the thicker coating. If a higher sintering temperature is employed more fugitive metal vehicle is necessary since there will be some evaporation of the fugitive vehicle prior to reaching the sintering temperature.

Such hafnium-tantalum coating applied as taught above can be deposited on substrates including tantalum, tungsten, molybdenum, columbium and their alloys, and additionally may also be applied to materials such as graphite and various ceramics.

Coating thicknesses may be varied up to at least 30 mils and we have shown that the protective capability of the slurry produced coatings is similar to that obtained for similar coatings produced by cladding.

Before proceeding further with the description of additional embodiments of our invention, it is now appropriate to consider some of the generic concepts underlying our invention. Basically we start with a substrate, either metal or ceramic, which is stable at elevated temperatures, i.e., has a relatively high melting point. We then form the slurry described above including relatively high melting point particulate metal coating constituent or constituents that form the finished coating. The fugitive metal vehicle is selected to have the following characteristics:

(a) It must melt and vaporize at temperatures below the melting point of the metal coating constituents;
(b) When molten it must wet both the metal coating constituents and the substrate material;
(c) The fugitive metal must have a relatively low solubility in the metal coating constituents and substrate material; and
(d) It must not detrimentally react with either the metal coating constituents or the substrate.

For the coating of graphite with a hafnium-tantalum alloy, reference should next be had to the following example:

Example 3

We coated graphite with hafnium-tantalum in much the same manner as that described in Example 2. A commercially available graphite rod, one-half inch in diameter x 3″ long, is dipped into a slurry of 20% by volume collodion in nitrocellulose lacquer with the metal powder constituents, all minus 325 mesh, being as follows:

| | Grams |
|---|---|
| Hafnium | 60 |
| Tantalum | 15 |
| Copper | 12.5 |
| Silver | 12.5 |

The graphite rod was dipped into the slurry composition to leave an adherent coating thereon which was permitted to air dry. The piece was then placed in a vacuum furnace ($10^{-5}$ mm. Hg) and brought up to approximately 300° F. in a one-half hour period to slowly drive off the liquid carrier vehicle. Again caution is recommended in raising the temperature of the piece at this point in order to not drive off or fracture the coating by the outgassing of the carrier. Then maintaining the vacuum at approximately $10^{-5}$ mm. Hg, the temperature was raised to 1760° F. and held there for 15 minutes in order to initiate sintering. We then heated to 2000° F. and held at that temperature for 15 minutes in order to accomplish liquid phase sintering of the metal coating constituents while at the same time commencing the driving off of the silver and causing concurrent sintering with the remaining copper. Subsequently, the following heat treatment schedule was employed:

2190° F. for 15 minutes
2370° F. for 15 minutes
2700° F. for 30 minutes

Following such heating practically all of the fugitive metal carrier had been removed and we had an excellent hafnium-tantalum coating on the graphite. The coating varied in thickness from 5 to 8 mils, although thicker coatings could of course be made by repeated dipping into the slurry initially.

Subsequently we attempted to oxidize the coated samples at 3500° F. (optical temperature) for 10 minutes in air. The coating was completely protective and there was no attack of the underlying carbon.

It should be further noted that if one wishes to reuse the coated graphite structure one should select initial graphite material with an expansion coefficient similar to that of the hafnium-tantalum.

We note further that the foregoing process may be used to coat practically all refractory ceramics including oxides, borides and carbides, provided that the requirements of the fugitive metal are met for wetting of the particular substrate by the particular coating.

Another embodiment of our invention is directed to the slurry coating of refractory substrates with novel ternary hafnium-tantalum alloys. In using the binary hafnium-tantalum as set forth above, we found excellent oxidation resistance during exposure to air at temperatures up to 3800° F. for up to one hour. As a considerable improvement thereover we have found that the present ternary hafnium-tantalum alloys exhibit excellent oxidation resistance for 100 hours at 2500° F. Included in this group of alloys are those containing ternary additions of chromium, aluminum or boron. We use specifically those compositions such as hafnium–25% tantalum containing for example 3% chromium or 1% aluminum or boron. The liquid carrier is the same as that described above and the fugitive metal constituent is selected from the group of metals copper, silver, tin and aluminum or alloys thereof.

Still another embodiment of our invention involves the coating of tungsten with an iridium or an iridium base alloy. By this means we have been able to protect tungsten substrates exposed to air at temperatures up to 4000° F.

Again in this embodiment a similar liquid carrier is employed as aforesaid. The preferable fugitive metal vehicle to use is copper but gold and silver may be similarly employed. It is required that such fugitive metal vehicle have a melting point below that of the iridium coating and the tungsten substrate, and preferably below 3000° F.; very limited mutual solid or liquid solubility with the tungsten substrate, a slight solubility for iridium in the liquid state and again it must wet both the tungsten and iridium, a requirement of all of the present slurry coating compositions. The metallic constituents in this embodiment range in composition (when copper is used) from 90% iridium–10% copper to 20% iridium–80% copper.

The deposition of the iridium coating onto tungsten may be best seen by reference to the following example:

Example 4

The particulate coating material consisted of 70 weight percent copper and 30 weight percent iridium. This was mixed with 3 ml. of collodion at a ratio of 3 ml. per 100 grams. of metallic powder; acetone was then added as desired to modify the consistency and viscosity of the slurry.

The slurry may be applied by dipping, brushing, spraying, etc., and then air dried prior to heat treatment. The heat treatment is then performed in an inert atmosphere and/or vacuum first to drive off the liquid carrier vehicle and subsequently to melt the fugitive vehicle component. Copper melts, wets both the iridium and the tungsten substrate. Heating to higher temperature removes the copper leaving an excellent iridium coating on the tungsten.

More specifically, after the carrier vehicle was removed, we heat treated as follows:

2230° F., argon, 2 hrs.
2190° F., vacuum, 2 hrs.
2370° F., vacuum, 1 hr.
3000° F., vacuum, 1 hr.

Another embodiment of our invention is directed to the slurry coating of columbium and columbium base alloys with either a ternary alloy consisting of molybdenum-titanium-aluminum or a quaternary alloy consisting of molybdenum-titanium-columbium-aluminum. In some instances, where the coating is to be used at even higher temperatures, silicon can be substituted for the aluminum in either the ternary or quaternary alloys.

Before proceeding further with the description of this embodiment, reference should first be had to a consideration of the utility of this alloy system. It is known to those skilled in the art that the use of columbium base alloys for turbine aircraft engines and space vehicle components requires the development of a reliable coating system capable of operating in air and under reduced pressure environments. Turbine aircraft requirements are generally long time operations at temperatures ranging up to 2500° F., whereas leading edge environments impose short time reduced air pressure exposure to approximately 3000° F. Both of these applications require ductile coatings on the columbium base alloy because of both particulate impact and/or cyclic operation. Currently available coating systems for the columbium base alloys have proven to be brittle and consequently exhibit reduced life under these operating conditions. In distinction to the teachings of the prior art the coatings resulting from the present slurry coating process yield ductile coatings for columbium.

For these purposes, a two layered coating is preferable. The inner layer consists of a ductile solid solution with moderate oxidation resistance while the outer layer consists of a brittle intermetallic compound with good oxidation resistance. Fractures occurring in the outer layer are terminated at the ductile solid solution layer which has sufficient oxidation resistance to prevent catastrophic oxidation.

We have determined that Mo-Ti-Al or Mo-Ti-Cb-Al solid solutions are well suited as the ductile sublayer when applied by the present slurry coating technique. Furthermore we apply onto this sublayer coatings for example gamma or trialuminide for the highly oxidation resistant outer layer.

As before the slurry deposition process is employed which consists of the two basic steps of applying the liquid slurry to the columbium base alloy substrate followed by heat treatment, usually in vacuum, under conditions in which densification of the slurry components occurs. Heat treatment first results in the driving off of the carrier vehicle, then the subsequent evaporation of the low melting fugitive metal component at least to a level at which it does not impair the oxidation resistance of the coating. In some instances the low melting metal can be incorporated as an inherent part of the coating and consequently may be reduced in composition only to the extent of raising the remelt temperature of the composition. One example of this material of course is aluminum. Thus while aluminum is mentioned as a component of the coating it really is more appropriate a component of the metallic fugitive vehicle member which is driven off during the heat treatment process leaving a coating primarily of titanium-molybdenum on the substrate.

To further understand this embodiment of our invention, reference should next be had to the following specific example thereof:

Example 5

A slurry was first formed of the following constituents by weight:

| | Percent |
|---|---|
| Titanium | 50 |
| Molybdenum | 10 |
| Aluminum | 10 |
| Copper | 10 |
| Collodion in nitrocellulose lacquer | 20 |

The slurry was applied to the columbium base alloy substrate by dipping and then air dried. It was then placed in a vacuum furnace ($10^{-5}$ mm. Hg) and the temperature raised from that of room temperature to 300° F. over a 30 minute period to slowly remove the liquid carrier vehicle. Heating was done slowly as before in order to outgas without breaking off the metallic elements of the coating. Then the temperature was slowly raised to 2000° F. and held at that point for 30 minutes in order to melt the copper aluminum, to wet the substrate and commence the liquid phase sintering of the titanium molybdenum. We then raised the furnace temperature to 2200° F. and held for one hour to drive off substantially all of the copper. It is noted that not all of the aluminum is removed since most of its goes into solid solution with the titanium-molybdenum. The temperature was then increased to 2500° F. to assure removal of most of the copper.

We note that this same type of coating may also be applied to tantalum base alloys. Additionally it can be used to coat molybdenum, tungsten, rhenium, iridium, chromium, graphite, and refractory oxides, borides and carbides.

In some case, rather than using elemental titanium, we found it desirable to use titanium hydride powder in lieu thereof. Another example of a slurry composition that can be treated as set out in Example 5 consists of from 15 to 25 weight percent copper, 54 to 68 percent titanium hydride powder, 11 to 14 percent molybdenum from 3 to 10 percent aluminum, all of said powders being approximately −325 mesh.

Still another embodiment of our invention involves the deposition of rhenium or rhenium base alloys as the result of a slurry coating. We apply such coating to a tungsten substrate with excellent results. The slurry coating consisted of 12 percent copper, 3 percent aluminum, balance rhenium in the liquid carriers described above. The application of the material was the same as that set forth above. For rhenium coatings, a final heat treatment at 3500° F. may be employed to assure attachment to the substrate by solid state diffusion.

The range of combinations of coatings and substrates which can be effected by our novel method is almost unlimited. We have found that after a substrate material is selected, a good coating can be applied by varying the composition of the fugitive metal vehicle until good wetting of the substrate is achieved.

It will be understood that various other modifications and variations may be effected without departing from the spirit or scope of the novel concepts of our invention.

We claim as our invention:

1. A novel alloy composition comprising about 25% tantalum, about 3% chromium, balance hafnium.
2. A novel alloy composition comprising about 25% tantalum, about 1% of a metal selected from the group consisting of aluminum and boron, balance hafnium.

References Cited

UNITED STATES PATENTS

| 2,234,969 | 3/1941 | Hensel et al. | 75—134 |
| 2,810,640 | 10/1957 | Bolkcom et al. | 75—134 |
| 3,070,468 | 12/1962 | Grant | 75—134 |

RICHARD O. DEAN, *Primary Examiner.*